Aug. 29, 1967  M. J. OAKLEY ETAL  3,338,452
CASE FOR STORAGE BATTERY CELL
Filed Nov. 23, 1964  2 Sheets-Sheet 2
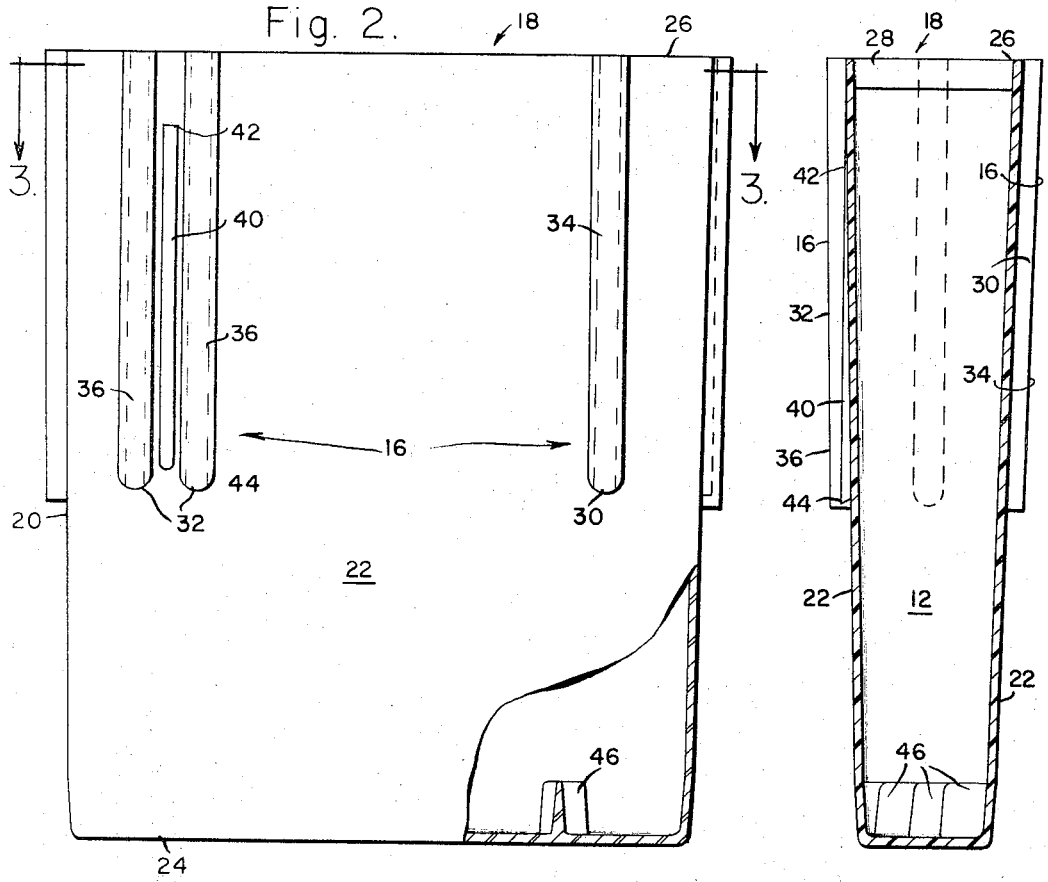
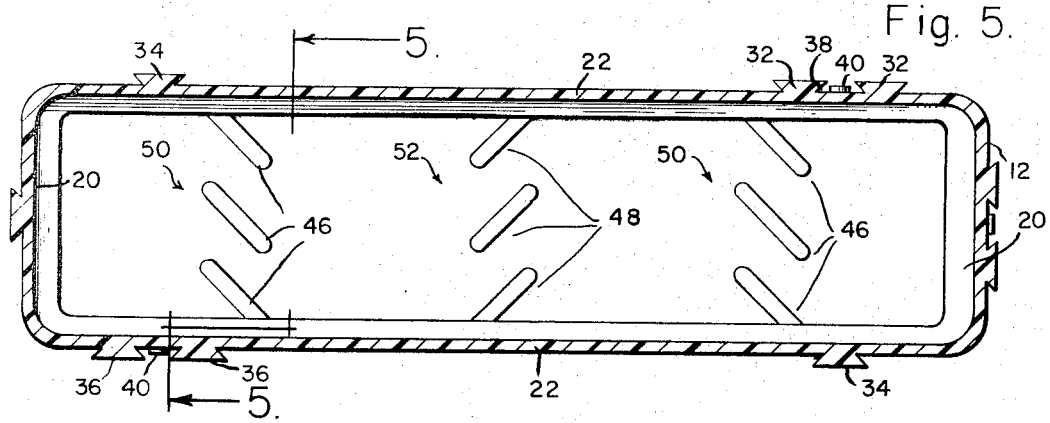
Michael J. Oakley,
Monica V. Oakley,
INVENTORS.
BY.
Golove & Kleinberg,
ATTORNEYS.

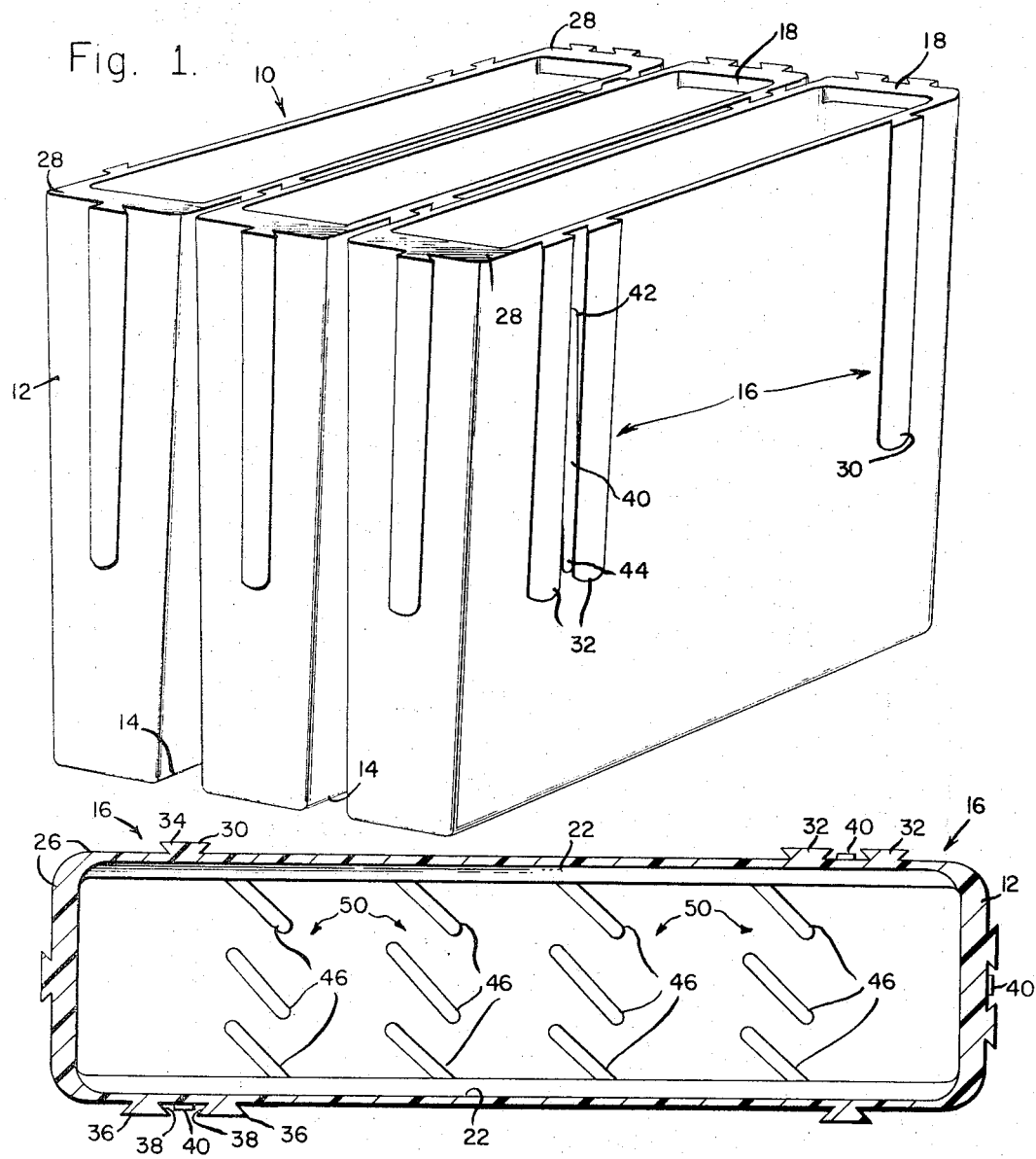

3,338,452
CASE FOR STORAGE BATTERY CELL
Michael J. Oakley and Monica V. Oakley, both of 5700
 Hollyridge Drive, Los Angeles, Calif. 90028
Filed Nov. 23, 1964, Ser. No. 413,014
4 Claims. (Cl. 220—23.4)

ABSTRACT OF THE DISCLOSURE

A case for a storage battery cell providing unitary construction and means for interlocking a plurality of cells, including splined dovetailed joints permitting the use of trapezoidal cells to provide ventilation while maintaining a rigid interlock with adjacent cells. Novel support members for supporting battery plates above the bottom of the cell are also shown.

---

The present invention relates to an electric storage battery and, more particularly, to a case for a battery cell adapted for interlocking with other similar cells to build up a battery of any desired voltage or amperage in various configurations.

Conventional batteries have been produced in one of two ways. One embodiment comprises a unitary container provided with a plurality of integral, individual compartments, each containing a set of plates and electrolyte. This configuration is advantageous because it is a solid unit requiring no special attachments to secure the battery in place for operation. Unitary construction is satisfactory when there is no need to increase the number of cells in the battery and when adequate ventilation exists to maintain normal operating temperatures. However, if a higher power rating is desired, either the battery must be redesigned to increase its capacity, or two or more similar batteries must be connected in parallel-series configurations to provide the voltage or amperage required. If there is insufficient ventilation, the battery may overheat possibly damaging either the battery or adjacent equipment. In consequence, special materials may be required for battery construction.

To avoid these problems, a second embodiment has used in the prior art in which individual separate cells are fastened together by racks, frames, or other means. These cells are so shaped that, when they are assembled, air spaces are provided between individual cells to facilitate air circulation and to improve the cooling of the cells. Such batteries, however, do not completely overcome the above-mentioned deficiencies, since they still do not adequately solve the problem of increasing the power-rating. Two or more sets of cells still must be secured in series-parallel combinations by utilizing additional parts in the form of attaching means.

Both of the above described embodiments employ relatively conventional means for supporting the plates above the bottom of the cells. It is recognized that such support is a necessity in order to prevent "shorting" between the plates as material flakes off of the plates and builds up at the bottom. Because electric storage batteries depend on chemical reaction between material carried by the plates and the electrolyte to produce electrical power, it is normal for some of this material to become dislodged and settle to the bottom. If sufficient material settles, a conductive connecting ridge is formed between adjacent plates, which ridge "shorts" the battery. To avoid such a short circuit, the plates must be raised above the bottom.

Further, it is not sufficient merely to raise the plates off the bottom. The electrolyte must be allowed to circulate freely within the cell and about the plates to insure proper functioning of the battery. At the same time, the circulation must be as free-flowing as possible to prevent turbulence which, if created within each cell, becomes harmful to the battery in that it shortens the battery's life by dislodging particles of material from the plate. Consequently, many designs for separating the plates from the bottom have been created.

In a preferred embodiment of the present invention, each cell includes a bottom and four walls to form a substantially rectangular container having an open end. The container may be considered a truncated, rectangular pyramid in that the circumference of the open end is of greater length than that of the bottom, so that the walls slant "inwardly" from top to bottom. This feature not only makes it easy to store and ship empty cells, but also provides for circulating air spaces when two cells are interlocked.

Connecting means are integrally formed on the walls and may be considered "male" and "female" connectors. In the preferred embodiment, a dovetail arrangement is used. The male connector comprises a ridge extending from the top of the cell, which ridge is provided with a cross-sectional trapezoidal configuration. The female connector comprises a pair of ridges extending from the top toward the bottom of the cell adapted to cooperate with the cross-section of the male, providing an interlocking or dovetailing fit effected by sliding the male connector ridge between the female connector ridges. Each of the wider cell walls are provided with a male and a female portion while one of the narrower end walls has a male and the other a female portion.

To effect a clamp between a pair of cells, a spline is disposed integrally on the wall between each female pair of ridges and both the male and female portions are inclined away from the wall to provide a substantially parallel join. Thus, when a male connector is inserted into the female connector, the spline forces the connectors into a tight engagement while tending to hold the cell pairs apart. Inasmuch as the adjacent cell walls diverge, this feature permits the cells to be assembled into a stable, upright battery. Any number of cells can be interlocked by linking adjacent side walls or end walls. Further, the spacing between the dovetail portions on the side walls and the overall dimension of the case can be arranged so that any desired interlocked arrangement of cells can be effected. For example, two cells can abut endwise to the side wall of a third cell. Because the individual cell modules can be interconnected in so many ways, virtually any series and/or parallel connection can be easily made. Further, a plurality of cells can be arranged to interfit in virtually any available space in a reasonably stable, interconnected unit. Obviously, the cells can be electrically connected into any series, parallel or combination arrangement to provide virtually any D.C. electrical need.

The invention further teaches a novel support within each cell module to raise grid plates from the cell bottom and to encourage free flow of electrolyte with minimum turbulence. The support comprises a plurality of relatively, short ribs disposed at an acute angle to the walls of the cell and extending only partially across the bottom. The ribs are disposed in discrete sets, each set provided with ribs in parallel to each other. Each set may be parallel to a preceding set or may be disposed normal thereto. In either case, the electrolyte flows freely.

It is therefore an object of the present invention to provide novel storage battery cell interconnection means.

It is another object of the invention to provide modular storage battery cells.

A further object of the invention is the provision of a modular storage battery cell whereby any number of cells may be interconnected.

Another object of the invention is to provide a storage battery cell interconnection whereby air spaces are maintained between individual cells.

It is a further object of the invention to provide an interlocking clamp between storage battery cells.

Still another object of the invention is the provision of a novel support for the plates of an electric storage battery.

Another object of the invention is to improve the circulation of electrolyte within an electric storage battery cell.

Another object of the invention is to provide a simple and inexpensive cell for an electric storage battery.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is an isometric view of three storage battery cells constructed according to the principles of the present invention, interlocked to form a battery;

FIG. 2 is a side elevational view of a cell according to the present invention with part of a wall cut away;

FIG. 3 is a top cross-sectional view of the cell of FIG. 2 taken along the line 3—3 in the direction of the appended arrows;

FIG. 4 is an alternative embodiment of the invention similar to that of FIG. 3; and FIG. 5 is an end cross-sectional view of the cell of FIG. 2 taken along line 5—5 in the direction of the appended arrows.

With reference to FIG. 1, a storage battery 10 comprising three cells 12 in interlocked engagement is shown. Because of the uniqueness of the interlocking feature, as will be fully set forth below, any number of cells 12 may be interlocked. However, for the sake of convenience, only three such cells 12 are disclosed. When interlocked, the cells are rigid but are spaced apart to form air spaces 14. These air spaces 14 are formed inasmuch as the side walls are inclined and because of a novel feature of the interlock. FIG. 1 omits the showing of the conventional battery plates, terminals and covers since these do not form a part of the invention. Their omission also makes possible a fuller understanding of an interconnecting means 16 according to the present invention and permits a view of an open end 18 of each cell 12.

Referring now to FIGS. 2, 3 and 5, a single cell 12 includes end walls 20, side walls 22, and a bottom portion 24, leaving the open end 18 as defined by the upper edge 26 of the walls. As seen in FIGS. 2 and 5 in particular, the circumferential periphery of the open end 18 is greater than that of the bottom portion. This disparity causes walls 20 and 22 to slope inwardly from top to bottom as in a truncated, rectangular pyramid. Thus, if two or more cells were placed side by side, so that the upper peripheries touched, the bottom portions would be displaced from each other creating the air spaces 14, as seen in FIG. 1.

Each cell is provided with lips 28 into which the cell covers can interfit and which provides additional structural strength for an individual cell 12.

Secured to each side wall 22, are connecting means 16 comprising a male portion 30 and a female portion 32. Each male portion 30 comprises a ridge 34 whose cross-sectional configuration may be that of a regular trapezoid. Each female portion 32 comprises a pair of ridges 36 having mutually facing surfaces 38 which are inclined with respect to walls 22. The female configuration is designed to be complementary to the male, consequently, so that the pair can dovetail together. Since, as shown by FIG. 3, for example, a male portion 30 is formed on a sidewall 22 in line with a female portion 32 on the adjacent side wall 22 of a second cell 12 it ins obvious that any two similar cells may be interlocked by merely sliding the male portion of one cell into the female portion of another cell. It is to be understood, of course, that in alternative embodiments, one side face may be provided with two male portions while the opposite side face may be provided with two female portions, again, all aligned.

In order to effect an interlocking clamp between a pair of cells 12, as well as to insure that the bottom portions are held separated for air circulation, a spine or spline 40 is formed on side wall 22 between ridges 36 that in combination define the female portion 32. As seen best in FIGS. 1 and 5, the spline varies in depth from its starting point 42 to its terminal point 44 as it extends from the open end toward the bottom portion. This variation is made to correspond to the taper of the side wall from the vertical and is designed to present a vertical face to an adjacent cell 12. Consequently, when male portion 30 of one cell is inserted into the female portion 32 of another cell, spline 40 forces surfaces of the mating surfaces together. At the same time, the spline maintains the separation of the cells at the bottom portions. This feature ensures that the cells are spaced apart in a rigid manner to make certain that air spaces 14 are not closed.

As an added novel feature of the present invention, a plurality of ribs 46 are disposed on the inner surface of the bottom portion 24. As shown, the ribs 46 are formed integrally with the bottom. They may also be secured together by other means and set into the cell 12. As shown in FIG. 3, the ribs are disposed in mututally parallel sets 50. As shown in FIG. 4, a second set 52 of ribs 48 arranged mutually parallel but adjacent sets 50, 52 are normal to each other, defining a herringbone pattern. Regardless of the relationship of one set to another, however, all ribs are angled with respect to walls 20 and 22. In the preferred embodiment, the angle is approximately 45°. It has been found that such an angled relationship reduces the turbulence of the electrolyte, although permitting circulation while maintaining the plates above the bottom portion.

While the foregoing is a description of the preferred embodiments, the following claims are intended to include those modifications and variations that are within the spirit and scope of the invention.

What is claimed as new is:

1. An electric storage battery cell comprising a container including four walls disposed in a truncated rectangular pyramid and a closed bottom portion, a female dovetail portion integrally secured on the outer face of one of said walls and extending vertically along the face of said one wall, a male dovetail portion integrally secured on the outer face of a wall opposite said one of said walls, said male dovetail portion extending vertically along the face of said opposite wall, substantially co-extensive with said female portion of said one wall, and a spline disposed centrally in said female dovetail portion having a thickness increasing toward said bottom portion, whereby the outer surface of said spline is substantially parallel to the vertical.

2. An electric storage battery cell comprising a container including four walls disposed in a truncated rectangular pyramid and a closed bottom portion, a pair of female dovetails integrally secured on the outer face of one of said walls, a second pair of male dovetails integrally secured on the outer face of another of said walls opposite said one of said walls, each of said dovetails extending from said top portion toward said bottom portion, each of said male dovetails being aligned with the corresponding female dovetail on the opposite wall, said female dovetails being provided with a spline member disposed centrally in each of said female pair of dovetails and said spline member having a variable thickness, increasing toward said bottom portion, said spline having an outer surface substantially parallel to the vertical.

3. An electric storage battery cell adapted to interlock with other substantially identical cells comprising a container including four walls disposed in a rectangular cross-section and a closed bottom portion, the perimeter of said cell being greater at the top portion that at said bottom portion, a female dovetail and a male dovetail integrally secured on the outer face of one of said walls, a female dovetail and a male dovetail integrally secured on the outer face of another of said walls opposite said one wall, each of said dovetails extending from said top portion toward said bottom portion, each of said male dovetails being aligned opposite a female dovetail, each female dovetail having a spline disposed centrally therein, said spline being of gradually increasing thickness toward said bottom portion, whereby the male and female dovetails of the wall of one cell are adapted to interfit into the female and male dovetails, respectively, of a second cell to provide a rigidly interconnected battery.

4. An electric storage battery cell comprising a container including four walls disposed in a truncated rectangular pyramid including a closed bottom portion, a plurality of ribs formed in said bottom portion and extending toward said top portion, said ribs in the cross-section having an acutely angled relationship with said walls and extending only partially across said bottom portion, a female dovetail integrally secured on the outer face of one of said walls, a male dovetail integrally secured on the outer face of another of said walls opposite said one of said walls, each of said dovetails extending vertically from said top portion toward said bottom portion, said female dovetail having a spline disposed centrally therein adapted to cooperate with a male dovetail to hold said dovetail locked together with an interfitted male dovetail and to maintain a pair of cells so interlocked in substantially parallel relationship.

References Cited
UNITED STATES PATENTS

| | | | |
|---|---|---|---|
| 3,147,151 | 9/1964 | Toce | 136—166 |
| 3,194,426 | 7/1965 | Brown | 220—23.4 |
| 3,264,140 | 2/1966 | Goble | 136—166 |

THERON E. CONDON, *Primary Examiner.*

G. T. HALL, *Assistant Examiner.*